United States Patent Office 3,127,401
Patented Mar. 31, 1964

3,127,401
2-BENZYL-3,4-DIHYDROQUINAZOLINES
Bernard C. Lawes and Homer C. Scarborough, Evansville, Ind., assignors to Mead Johnson & Company, Evansville, Ind., a corporation of Indiana
No Drawing. Filed Dec. 18, 1961, Ser. No. 160,228
5 Claims. (Cl. 260—251)

The present invention is concerned with 2-benzyl-3,4-dihydroquinazoline, 2-benzyl-3-methyl-3,4-dihydroquinazoline, certain methoxyl analogs thereof, and the pharmaceutically acceptable acid addition salts of these substances. It is further concerned with therapeutic applications of these compounds in the treatment of inflammatory conditions.

The present substances have the following structural formula in which R is either a hydrogen atom or a methyl group, and X and Y are hydrogen or methoxyl.

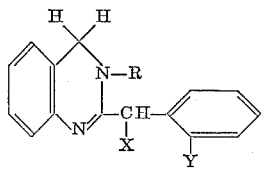

The present substances are particularly of interest as anti-inflamatory agents but also possess analgesic and smooth muscle depressant activity. The latter is illustrated by the fact that 2-benzyl-3,4-dihydroquinazoline has approximately 70% the activity of aminophylline in relaxing spontaneous contractions of the isolated guinea pig tracheal spiral (Lish et al., J. Pharmacology Experimental Therapeutics, 129, 191 (1960)). This substance in doses of 12.5 mg./kg. of body weight also exhibits a marked capacity to prevent the phenylquinone writhing syndrome in mice (Hendershot and Forsaith, J. Pharmacology Experimental Therapeutics, 125, 237 (1959)).

The anti-inflamatory activity of these substances is reflected by the capacity of 2-benzyl-3-methyl-3,4-dihydroquinazoline, 2-benzyl-3,4-dihydroquinazoline, and 2-(2-methoxybenzyl)-3,4-dihydroquinazoline to decrease the edema induced by the sub-plantar injection of formalin into the rat paw (Lish et al., Arch. Int. Pharmacodynamie, 129, 81 (1960)). At doses of 16 mg./kg., 5 mg./kg., and 30 mg./kg. of body weight of these substances respectively, the same degree of inhibition was provided as a dose of 90 mg./kg. of body weight of the established anti-inflammatory agent chloroquine diphosphate. 2-(α-methoxybenzyl)-3,4-dihydroquinazoline is somewhat more effective at a dose of 5 mg./kg. of body weight in inhibiting formation of erythema in guinea pigs on exposure to ultraviolet light than the same dose of phenylbutazone, a clinically established anti-inflammatory agent (Wilhelmi, Schweiz, Med. Wschr., 25, 577 (1949), Winder et al., Arch. Int. Pharmacodyn, 116 (1958).

The present substances may be administered for their anti-inflammatory effect in doses within the range 0.2 to 30 mg./kg. of body weight depending upon the host, the nature of the condition being treated, and the compound selected. Liquid and solid dosage units containing from 5 mg. to 100 mg. of one of the present products are preferred. Pharmaceutical carriers of the usual type may be employed including corn starch, lactose, calcium phosphate, polyethylene glycol, water, sesame oil, peanut oil, propylene glycol, etc.

The present compounds are prepared by Raney nickel desulfurization of the appropriate 2-benzyl-4-quinazolinethione as pictured in the following reaction sequence in which X, Y, and R have the same meaning as above. The quinazolinethione is prepared from the corresponding quinazolone by treatment with phosphorous pentasulfide.

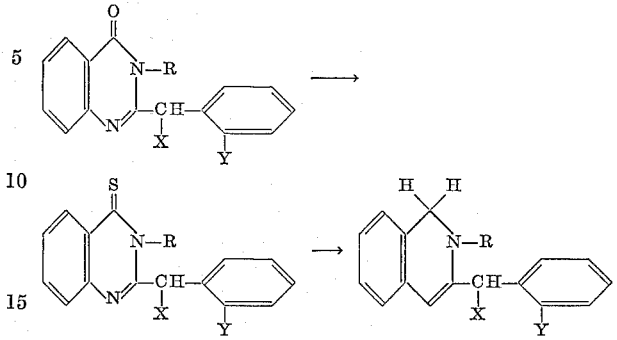

When R is a hydrogen atom in the intermediate thione, the compound may exist as the tautomeric 2-benzyl-4-mercaptoquinazoline. This is not possible when R is a methyl group. In any event this tautomerism has no effect on the course of the reaction. For desulfurization it is preferred to use a highly pyrophoric Raney nickel catalyst although less active catalysts may be used. Lower yields and greater by-product formation occur when less active catalysts are employed.

An alternate route for the preparation of the 3-unsubstituted-2-benzyl-3,4-dihydroquinazolines involves catalytic hydrogenolysis of the corresponding 2-benzyl-4-chloroquinazoline. The latter are prepared from the appropriate 2-benzyl-4-quinazolone by treatment with from about two-thirds up to one molecular proportion of phosphorous oxychloride in the presence of a tertiary amine, preferably diethylaniline. The hydrogenation step is preferably conducted with a palladium catalyst and a sufficient amount of a neutralizing agent such as sodium acetate to absorb evolved hydrogen chloride. These and other procedures are described in detail below.

*Procedures 1, 2, and 3: 2-benzyl-4-quinazolone.*—A mixture of 1 mole of anthranilamide and 1.3 moles of phenylacetic acid is heated at 175–180° C. with stirring for 1¾ hrs. The reaction mixture is allowed to cool and while still warm is triturated with several volumes of isopropyl acetate. The product solidifies and is then collected on a filter and washed with isopropyl acetate. It is then recrystallized from a mixture of dimethylformamide and isopropyl acetate to provide 2-benzyl-4-quinazolone in pure crystalline form, M.P. 253–254° C., yield, 41%.

The method of Procedure 1 is adapted to the preparation of the methoxy substituted 2-benzyl-4-quinazolones with the results summarized in Table I.

TABLE I

Methoxy-2-benzyl-4-Quinazolones

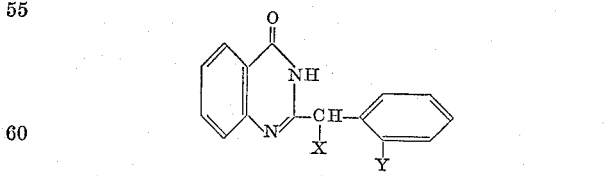

| Procedure | X | Y | Reaction | | Recrystallization solvent |
| --- | --- | --- | --- | --- | --- |
| | | | Time, hr. | Temperature, °C. | |
| 2 | H | CH₃O | 2¼ | 190–195 | Dimethylformamide-isopropyl acetate. |
| 3 | CH₃O | H | 3 | 175–180 | Ethanol. |

*Procedure 4: 2-benzyl-3-methyl-4-quinazolone.*—2-benzyl-4-quinazolone is converted to its 3-methyl homolog by heating 37.8 g. (0.16 mole) thereof and 28.4 g. (0.20 mole) of methyl iodide with 150 ml. of methanol containing 10.6 g. (0.19 mole) of potassium hydroxide under reflux for 23.5 hrs. The solvent is then distilled at reduced pressure, and the residue extracted with ether. The ether is removed by distillation yielding 32.2 g. of 2-benzyl-3-methyl-4-quinazolone which is recrystallized from isopropyl ether to yield 29.2 g. (73%) of the purified intermediate, M.P. 86.5–88.0° C.

*Procedure 5: 2-benzyl-4-mercaptoquinazoline.*—2-benzyl-4-quinazolone, 30 g., and 350 ml. of xylene are placed in a 2 l. three-necked flask and a portion of the solvent is distilled to remove traces of moisture. One molecular proportion of phosphorous pentasulfide is then added to the hot solution and the mixture is refluxed with stirring for 1 hr. It is then cooled to room temperature and treated with 600 ml. of 5% aqueous potassium hydroxide. The organic layer is separated from the aqueous layer and the latter is filtered to remove insoluble material. The aqueous filtrate is then washed with ether and neutralized with acetic acid, resulting in precipitation of crude 2-benzyl-4-mercaptoquinazoline in 86% yield. It is recrystallized from ethyl acetate to provide the analytically pure material, M.P. 215–216° C.

*Analysis.*—C, 71.37; H, 4.75; S, 12.44.

*Procedure 6: 2-(2-methoxybenzyl)-4-mercaptoquinazoline.*—The method of Procedure 5 is applied to 2-(2-methoxybenzyl)-4-quinazolone with production of the desired product in analogous fashion; recrystallized from isopropyl acetate, M.P. 174–176° C.

*Analysis.*—C, 68.24; H, 5.13; N, 9.82; S, 11.34.

*Procedure 7: 2-(α-methoxybenzyl)-4-mercaptoquinazoline.*—The method of Procedure 5 is repeated substituting toluene as the solvent and 2-(α-methoxybenzyl)-4-quinazolone as starting material. A reflux period of 15 min. is used and the product is recrystallized from low boiling petroleum ether, M.P. 107–109° C.

*Analysis.*—C, 68.34; H, 4.92; S, 11.35.

*Procedure 8: 2-benzyl-3-methyl-4-quinazolinethione.*—A mixture of 23.8 g. (0.11 mole) of 2-benzyl-3-methyl-4-quinazolone and 36.6 g. (0.165 mole) of phosphorus pentasulfide in 150 ml. of dry pyridine is refluxed under nitrogen for 6 hrs. The hot mixture is then poured into 400 ml. of water. The brown precipitate is collected from the cooled aqueous slurry and extracted with warm ether. Removal of the solvent from the ether extracts provides the desired thione which is recrystallized from isopropyl ether, M.P. 89–91° C.

*Analysis.*—C, 72.18; H, 5.40; N, 10.22; S, 11.86.

*Procedure 9: 2-benzyl-3-methyl-3,4-dihydroquinazoline hydrochloride.*—A highly pyrophoric Raney nickel catalyst is prepared by exhaustively washing conventional commercial grade material (Raney Catalyst Company, Inc.) with water followed by ethanol to remove alkali occluded on the surface thereof. A mixture of 32 g. thereof and 12.65 g. (0.0475 mole) of 2-benzyl-3-methyl-4-quinazolinethione is stirred for 25 min. at room temperature with 100 ml. of absolute ethanol. The catalyst is removed by filtration and the colorless filtrate is acidified with 9 ml. of 5.65 N ethanolic hydrogen chloride. 2-benzyl-3-methyl-3,4-dihydroquinazoline hydrochloride is obtained in 95.7% yield (12.4 g.), as a white crystalline solid, M.P. 233–237° C. It is twice recrystallized from isopropyl alcohol-isopropyl acetate to yield the analytically pure material, M.P. 243–245° C.

*Analysis.*—C, 70.16; H, 6.52; N, 9.92; Cl. 12.78;

$$\lambda_{Max.}^{H_2O} \ 288 \ m\mu \ (\epsilon=6710); \lambda_{Max.}^{0.1 \ N \ NaOH} = 306 \ m\mu \ (\epsilon=7320)$$

*Procedures 10, 11, and 12.*—The 3,4-dihydroquinazolines listed in Table II are prepared by refluxing 0.1 mole of the corresponding 4-mercaptoquinazoline in 150 ml. of absolute methanol with activated Raney nickel catalyst with the passage of a stream of hydrogen gas through the reaction mixture during the reflux period. A reaction time of 5 hrs. is employed and a fresh portion of Raney nickel catalyst is added at 45 min. intervals. A total of 88 g. (wet weight) of Raney nickel catalyst is used. The product is recovered as indicated in Procedure 9 by treatment of the reaction filtrate with ethanolic hydrogen chloride and distillation of a portion of the solvent to assure good crystallization yield. The physical properties of these substances and recrystallization solvents employed are listed in Table II.

TABLE II

*Substituted 3,4-Dihydroquinazoline Hydrochlorides*

| Procedure | X | Y | Recrystallization Solvent [1] | M.P. (° C.) | Composition | | | | $\lambda_{Max.}^{H_2O}$ | $\lambda_{Max.}^{0.1 \ N \ NaOH}$ |
|---|---|---|---|---|---|---|---|---|---|---|
| | | | | | C | H | N | Cl | | |
| 10 | H | H | MeOH-Et$_2$O | 189–191 | | | 9.13 | [2] 26.66 | 282 m$\mu$ ($\epsilon$=5400) | 294 m$\mu$ ($\epsilon$=6370) |
| 11 | H | CH$_3$O | 1-PrOH-iPrOAc | 209–211 | 66.21 | 5.98 | 9.60 | 12.30 | 276 m$\mu$ ($\epsilon$=8230) | 285 m$\mu$ ($\epsilon$=7450) |
| 12 | CH$_3$O | H | 2-butanone | [3] 101–106 | 63.13 | 6.41 | 9.37 | 11.21 | 284 m$\mu$ ($\epsilon$=6100) | 286 m$\mu$ ($\epsilon$=5890) |

[1] Chemical Abstracts abbreviations.
[2] 2-benzyl-3,4-dihydroquinazoline hydrobromide; Br. analysis given.
[3] 2-(α-methoxybenzyl)-3,4-dihydroquinazoline hydrochloride recovered as the monohydrate.

*Procedure 13: 2-benzyl-3,4-dihydroquinazoline.*—The free base form of the product of Procedure 10 is obtained by treatment of the hydrobromide salt described therein with 15% aqueous sodium hydroxide and extraction of the aqueous solution with chloroform. The crude product obtained by evaporation of the chloroform extract is recrystallized from diethyl ether, yielding 2-benzyl-3,4-dihydroquinazoline as white crystals, M.P. 123–125° C.

*Analysis.*—C, 80.87; H, 6.29; N, 12.73;

$$\lambda_{Max.}^{H_2O} = 293 \ m\mu \ (\epsilon=7540); \lambda_{Max.}^{0.1 \ N \ HCl} = 281 \ m\mu \ (\epsilon=6490);$$

$$\lambda_{Max.}^{0.1 \ N \ NaOH} = 293 \ m\mu \ (\epsilon=7560)$$

Free bases are prepared from the acid addition salts described in Procedures 9, 11 and 12 in analogous fashion.

*Procedure 14: 2-benzyl-3,4-dihydroquinazoline hydrochloride.*—Treatment of the free base of Procedure 13 in ethanolic solution with hydrogen chloride and dilution of the resulting solution with approximately 10 volumes of diethyl ether results in precipitation of the desired salt as a light-yellow crystalline solid which after recrystallization from ethanol-ethyl acetate provides the analytically pure product as a white crystalline solid, M.P. 208–211° C.

*Analysis.*—N, 10.64; Cl, 13.63, $$\lambda_{Max.}^{H_2O} = 281 \ m\mu \ (\epsilon=5980)$$

Other pharmaceutically acceptable acid addition salts such as the nitrate, phosphate, sulfate, acetate, citrate, mucate, gluconate, propionate, etc., are prepared in analagous fashion.

*Procedure 15: Tablets of 2-benzyl-3,4-dihydroquinazoline hydrochloride.*—A dry blend of 180 g. of lactose, U.S.P. and 1.0 g. of acacia powder, U.S.P. is prepared and granulated with a 10% w./w. water paste containing 3 g. of corn starch, U.S.P. The moist granulation is passed through a No. 12 screen and dried at 130° F. until the granules contain less than 2% water. The dried granules are then reduced in size and strained through a No. 20 screen. The following materials are then added and thoroughly blended with the granules.

| | G. |
|---|---|
| 2-benzyl-3,4-dihydroquinazoline hydrochloride | 10 |
| Talc | 4 |
| Stearic acid powder | 2 |

The total weight of this preparation is 200 g. It is compressed into tablets each containing 10 mg. of 2-benzyl-3,4-dihydroquinazoline hydrochloride using a 5/16″ standard concave punch and die.

*Procedure 16: 2-benzyl-4-chloroquinazoline.*—A mixture of 7.1 g. (0.03 mole) of 2-benzyl-4-quinazolone, 9.0 g. (0.06 mole) of N,N-diethylaniline, 3.1 g. (0.02 mole) of phosphorous oxychloride, and 100 ml. of benzene is heated at reflux for 2½ hours. The small amount of insoluble material present in the cooled reaction mixture is removed by filtration and the filtrate is diluted with 100 ml. of benzene. The benzene solution is then washed with 125 ml. of cold water, with 20% aqueous sodium hydroxide, and finally with two more portions of water. The organic layer is separated, dried over magnesium sulfate, and the solvent distilled to leave an oil which crystallines on standing. It is recrystallized from heptane to provide the analytically pure material, M.P. 74–75.5° C.

*Analysis.*—C, 70.54; H, 4.53; N, 10.93; Cl, 13.96.

*Procedure 17: 2-benzyl-3,4-dihydroquinazoline hydrochloride via 2-benzyl-4-chloroquinazoline.*—A mixture of 0.03 mole of 2-benzyl-4-chloroquinazoline, 0.03 mole of powdered anhydrous sodium acetate, 0.4 g. of carbon-supported palladium catalyst (10%), and 75 ml. of absolute methanol is hydrogenated at 60 p.s.i.g. for approximately 15 minutes. The calculated quantity of hydrogen, 0.06 mole is absorbed during this period and the reaction ceases, as is evident by lack of further hydrogen to be absorbed. The catalyst is removed by filtration and the filtrate acidified with 6.0 ml. of 5.65 N ethanolic hydrogen chloride. The solvent is distilled and the residue triturated with a small amount of cold water to remove by-product of sodium chloride. The product is recrystallized as indicated in Procedure 14 and found to be identical to the product described in that procedure.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

What is claimed is:
1. A compound selected from the group consisting of:

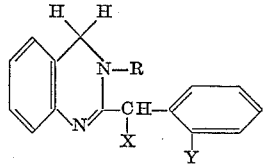

wherein X and Y are selected from the group consisting of hydrogen and methoxy, R is selected from the group consisting of hydrogen and methyl, and the pharmaceutically acceptable acid addition salts thereof.
2. 2-benzyl-3,4-dihydroquinazoline.
3. 2-benzyl-3-methyl-3,4-dihydroquinazoline.
4. 2-(2-methoxybenzyl)-3,4-dihydroquinazoline.
5. 2-(α-methoxybenzyl)-3,4-dihydroquinazoline.

References Cited in the file of this patent
UNITED STATES PATENTS

| 2,408,633 | Guenther et al. | Oct. 1, 1946 |
| 2,439,386 | Guenther et al. | Apr. 13, 1948 |
| 2,953,494 | Cook et al. | Sept. 20, 1960 |
| 2,995,491 | Schmidt | Aug. 8, 1961 |

OTHER REFERENCES

Maffei: Gazz Chim et al., vol. 59 (1929), pages 3–9.
Lora-Tamayo: Chem. Berichte, vol. 94 (1961), pages 208–16, at pages 209–11.